(Model.)
G. W. SMITH.
FIFTH WHEEL FOR VEHICLES.
No. 258,143. Patented May 16, 1882.
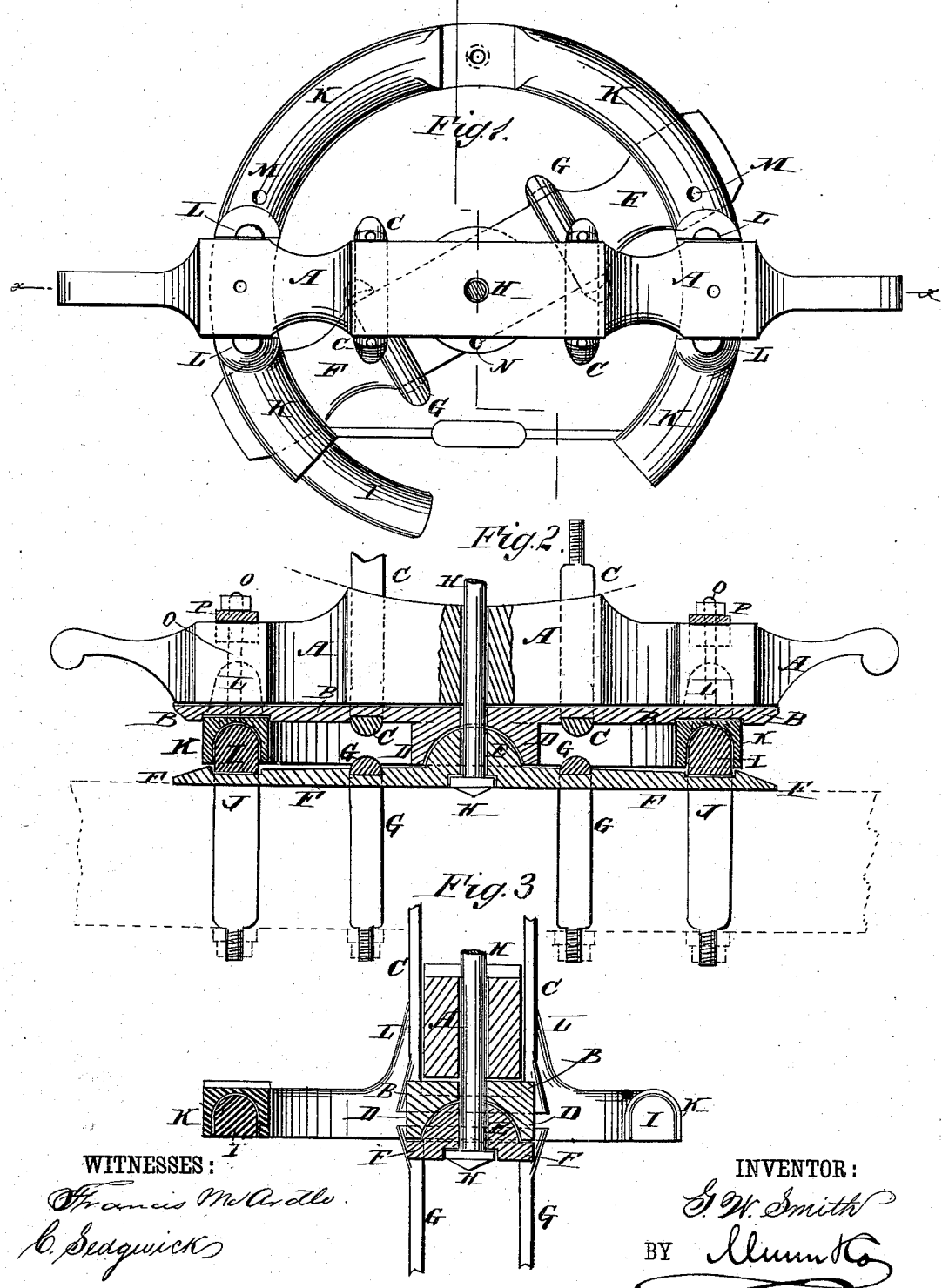
WITNESSES:
Francis McArdle
C. Sedgwick
INVENTOR:
G. W. Smith
BY Munn & Co
ATTORNEYS.

UNITED STATES PATENT OFFICE.

GEORGE W. SMITH, OF DARLINGTON, WISCONSIN.

FIFTH-WHEEL FOR VEHICLES.

SPECIFICATION forming part of Letters Patent No. 258,143, dated May 16, 1882.

Application filed November 11, 1881. (Model.)

*To all whom it may concern:*

Be it known that I, GEORGE WASHINGTON SMITH, of Darlington, in the county of La Fayette and State of Wisconsin, have invented a new and useful Improvement in Fifth-Wheels for Vehicles, of which the following is a full, clear, and exact specification.

Reference is to be had to the accompanying drawings, forming part of this specification, in which similar letters of reference indicate corresponding parts in all the figures.

Figure 1 is a plan view of my improvement shown as applied to a head-block. Fig. 2 is a front elevation of the same, partly in section through the line $x$ $x$, Fig. 1. Fig. 3 is a sectional elevation of the same.

The object of this invention is to promote security in vehicles by constructing the fifth-wheels in such a manner that they will not be liable to get out of place and break when exposed to a side strain.

A represents the head-block, to the lower side of which is secured the upper center plate, B, by clips C. The clips C fit into grooves in the lower side of the center plate B and pass around the said center plate B the head-block A, and the spring placed upon the said head-block, so as to bind the said parts firmly together. Upon the lower side of the center of the plate B is formed a projection, D, which is concaved upon its lower side to receive and fit upon a convexed projection, E, formed upon the center of the upper side of the lower center plate, F. The lower center plate, F, is secured to the axle by clips G, which fit into grooves in the upper side of the said center plate F, and by the clips J, which are welded to the lower circle, I, and pass around the lower center plate, F, and the axle, and thus fasten the said circle, center plate, and axle firmly together. The king-bolt H passes through the centers of the two plates B F and through the centers of the projections D E and the head-block A. The king-bolt is also designed to pass through the lower part of the spring and through a plate interposed between the clips C, and has a nut screwed upon its upper end. The clip-plate is designed to prevent the clips from working toward each other and getting loose. The spring clip-plate and king-bolt nut are not shown in the drawings. The head of the king-bolt H is made square, and is fitted into a square recess in the lower center plate, F, so that the said center plate and king-bolt will turn together to prevent the head of the king-bolt from being worn.

I is the lower part or circle of the fifth-wheel, which fits into cross-grooves upon the upper side of the end parts of the lower center plate, F, and has clips J formed upon the lower side of its end parts, which project across the edges of the said center plate F and the sides of the axle, so that the said part I will be held securely in place, as hereinbefore stated. The sides of the part or circle I of the fifth-wheel are vertical, and its top is oval to fit into the correspondingly-shaped interior of the upper part, circle, or shell, K, of the fifth-wheel. The upper part, K, of the fifth-wheel fits into cross-grooves in the lower side of the end parts of the upper center plate, B, and has lugs L formed upon it near its ends, which pass up across the edges of the said center plate B and overlap the sides of the head-block A to keep the said part K of the fifth-wheel in place. The upper part, K, of the fifth-wheel is further secured in place by bolts O, which pass up through the said upper part, K, through the upper center plate, B, through the head-block A, and through the plates P, placed upon the top of the said head-block. The heads of the bolts O are countersunk in the lower or concave side of the circle K, as shown in dotted lines in Fig. 2. The ends of the plates P are bent downward, or have lugs formed upon them to overlap the sides of the end parts of the head-block A to strengthen the said head-block against splitting. With this construction the friction will be upon the top of the part I of the fifth-wheel, except when there is a side strain, and then the friction will be upon the top and sides of the said part.

In the upper part or shell, K, of the fifth-wheel, a little in the rear of the head-block A, are formed oil-holes M, and in the forward part of the projection D is formed an oil-hole, N, so that the friction-surfaces can be conveniently lubricated. With this construction any oil that may escape from the friction-surfaces will drop to the ground instead of spreading over the sides of the fifth-wheel, causing dust to adhere to the said sides and disfiguring the vehicle.

I am aware that the upper plate has been connected with the bolster-plate by a convexity on upper plate and a concavity in lower plate; also, that the circle-plates have been connected by a tongue and groove of V shape; also, that the upper plate has been grooved to fit over the lower one; but

What I claim as new and of my invention is—

The center plates, B F, the former connected with head-block and the latter with axle, in combination with a king-bolt, H, having its head fitted in a square recess of plate F, the circle I, fitting cross-grooves of said plate, and the circle K, overlapping the sides of circle I, as shown and described.

GEORGE W. SMITH.

Witnesses:
P. A. ORTON,
GEO. S. ANTHONY.